United States Patent
Sinzger et al.

Patent Number: 6,025,121
Date of Patent: *Feb. 15, 2000

[54] COLOR PHOTOGRAPHIC RECORDING MATERIAL

[75] Inventors: Klaus Sinzger, Leverkusen; Stefan Herrmann, Bonn; Michael Missfeldt, Leichlingen, all of Germany

[73] Assignee: Agfa-Gevaert NV, Germany

[ * ] Notice: This patent is subject to a terminal disclaimer.

[21] Appl. No.: 09/140,853

[22] Filed: Aug. 27, 1998

Related U.S. Application Data

[63] Continuation-in-part of application No. 09/089,891, Jun. 4, 1998, Pat. No. 5,942,382.

[30] Foreign Application Priority Data

Jun. 11, 1997 [DE] Germany ............... 197 24 585

[51] Int. Cl.⁷ ..................................... G03C 1/16
[52] U.S. Cl. ............................. 430/583; 430/581
[58] Field of Search ..................... 430/583, 581

[56] References Cited

FOREIGN PATENT DOCUMENTS

| | | |
|---|---|---|
| 683 427 | 5/1995 | European Pat. Off. . |
| 4008067 | 9/1991 | Germany . |
| 4038965 | 6/1992 | Germany . |

*Primary Examiner*—Thorl Chea
*Attorney, Agent, or Firm*—Connolly, Bove, Lodge & Hutz,LLP

[57] ABSTRACT

A color photographic recording material contains at least one photosensitive silver halide emulsion layer which is spectrally sensitized with a monomethine cyanine dye of the formula I

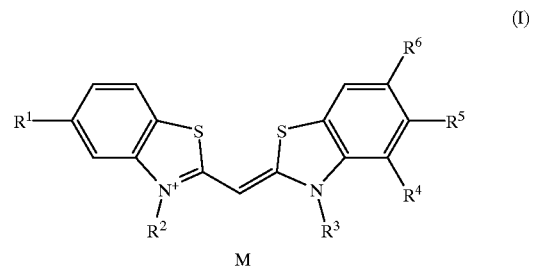

in which:
- $R^1$ denotes a benzothiophene radical which is coupled by way of the 2-, 3-, 4-, 5-, 6- or 7-position thereof to the benzo ring of the benzothiazole group,
- $R^2$ and $R^3$ (the same or different) denote sulphoalkyl, carboxyalkyl, $-(CH_2)_n-SO_2-NH-SO_2$-alkyl, $-(CH_2)_n-SO_2-NH-CO$-alkyl, $-(CH_2)_n-CO-NH-SO_2$-alkyl or $-(CH_2)_n-CO-NH-CO$-alkyl and (n=1–6);
- $R^4$ to $R^6$ (the same or different) denote hydrogen, halogen, $-CN$, $-CF_3$, alkyl, alkoxy, aryl or a heterocyclic group;

or $R^5$ together with $R^4$ or $R^6$ denotes the remainder which is necessary to complete an optionally substituted condensed-on benzene or naphthalene ring;

M denotes a cation necessary to balance the charge.

The recording material has increased blue sensitivity.

7 Claims, No Drawings

COLOR PHOTOGRAPHIC RECORDING MATERIAL

This application is a continuation-in-part of Ser. No. 09/089,891 filed Jun. 4, 1998, U.S. Pat. No. 5,942,382.

The invention relates to a colour photographic recording material having at least one photosensitive silver halide emulsion layer which is spectrally sensitized with a monomethine cyanine dye.

Improving the spectral sensitivity of photographic materials is an on-going challenge. It is possible to broaden sensitivity beyond the intrinsic sensitivity range by the use of polymethine dyes. Cyanine dyes are particularly suitable for this. In the case of silver chloride emulsions the requirements for a spectral sensitizer for the blue region of the spectrum (400–500 nm) are as important as for the green and red regions, because the intrinsic sensitivity range of silver chloride emulsions is predominantly in the ultraviolet region of the spectrum, and, unlike silver bromide emulsions, the blue sensitivity of these emulsions is consequently low.

EP-A-0 683 427 describes benzothiazole monomethine cyanines which carry at least one 5-membered heterocycle (furanyl, thienyl, pyrrolyl) as a substituent on the benzo ring and result in good blue sensitivities on AgCl emulsions.

It has been found that benzothiazole monomethine cyanine dyes of the general formula I are excellent blue sensitizers, in particular for silver chloride emulsions.

The present invention provides a colour photographic recording material having at least one photosensitive silver halide emulsion layer which is spectrally sensitized with a monomethine cyanine dye, characterised in that the monomethine cyanine dye corresponds to the following general formula I:

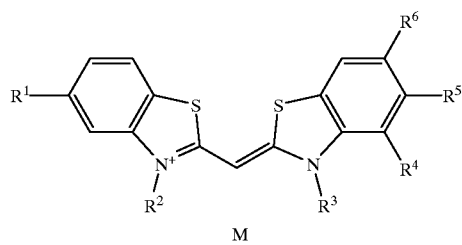

(I)

in which:

$R^1$ denotes a benzothiophene radical which is coupled by way of the 2-, 3-, 4-, 5-, 6- or 7-position thereof to the benzo ring of the benzothiazole group, $R^2$ and $R^3$ (the same or different) denote sulphoalkyl (preferably sulphopropyl), carboxyalkyl (preferably carboxymethyl), $-(CH_2)_n-SO_2-NH-SO_2-$alkyl, $-(CH_2)_n-SO_2-NH-CO-$alkyl, $-(CH_2)_n-CO-NH-SO_2-$alkyl or $-(CH_2)_n-CO-NH-CO-$alkyl (n=1–6);

$R^4$ to $R^6$ (the same or different) denote hydrogen, halogen (preferably chlorine), $-CN$, $-CF_3$, alkyl (preferably methyl), alkoxy (preferably methoxy), aryl (preferably unsubstituted phenyl or phenyl substituted with, for example, halogen or alkyl) or a heterocyclic group (preferably thienyl, pyrrolyl or indolyl); or $R^5$ together with $R^4$ or $R^6$ denotes the remainder which is necessary to complete an optionally substituted condensed-on benzene or naphthalene ring;

M denotes a cation necessary to balance the charge.

An alkyl radical represented by one of the radicals $R^4$ to $R^6$ has a straight or branched chain and contains up to 4 C atoms. A heterocyclic group represented by one of the radicals $R^5$ and $R^6$ may be, for example, a benzothiophene radical which is coupled by way of the 2-, 3-, 4-, 5-, 6- or 7-position thereof with the benzo ring of the benzothiazole group. An N-indolyl radical represented by one of the radicals $R^4$ to $R^6$ may optionally be substituted, for example with chlorine or methoxy.

Examples of substituents on a condensed-on benzene ring completed with the participation of two of the radicals $R^4$, $R^5$ and $R^6$ are halogen, in particular chlorine, alkyl and alkoxy.

Examples of suitable dyes of the formula I are indicated below

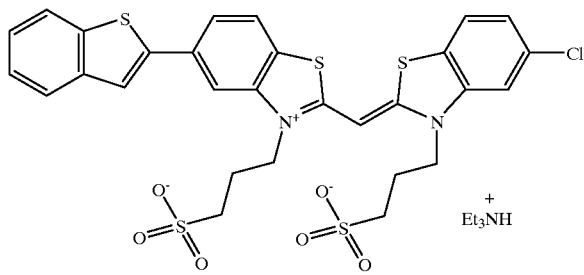

I-1

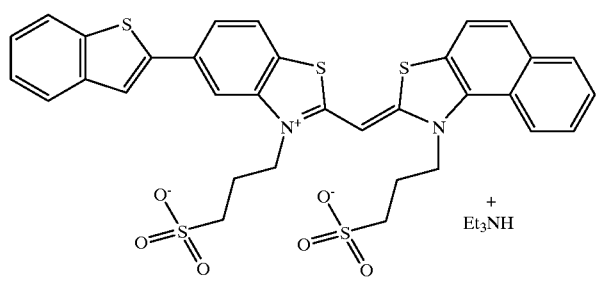
I-2
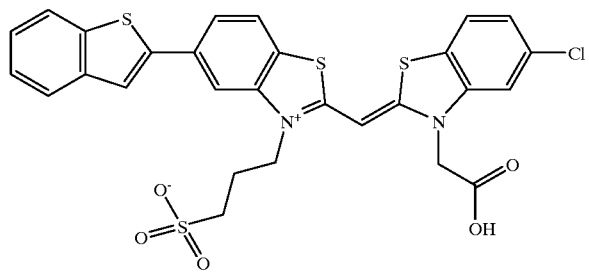
I-3
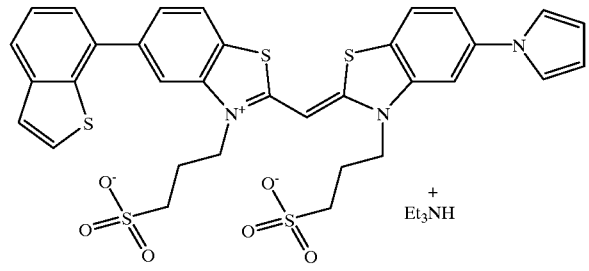
I-4
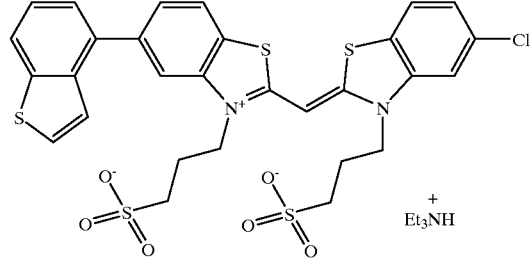
I-5
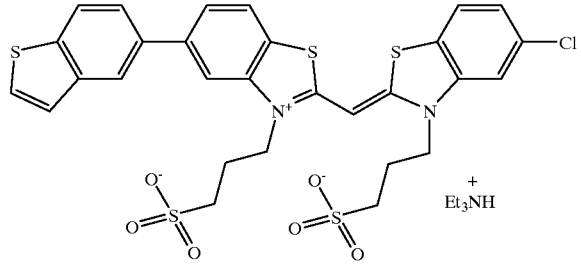
I-6

I-7
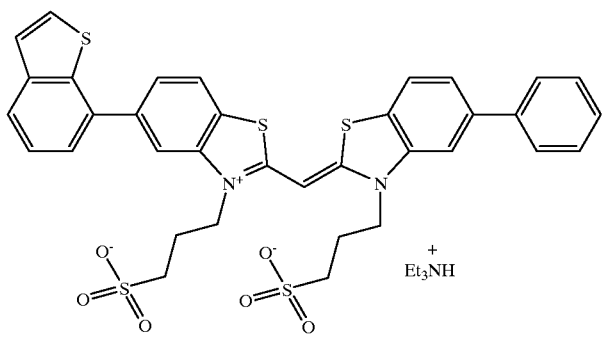
I-8
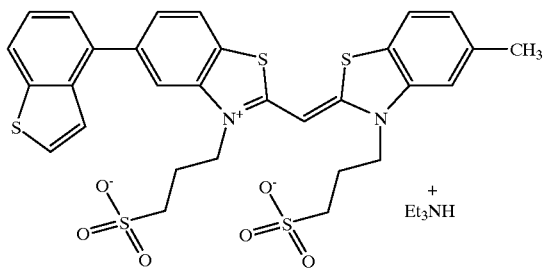
I-9
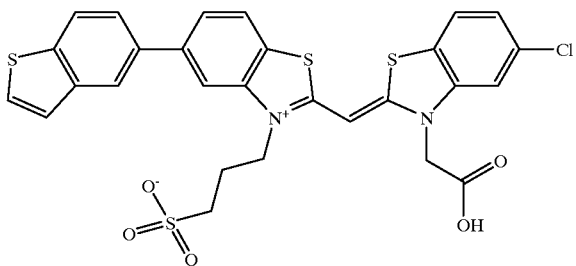
I-10
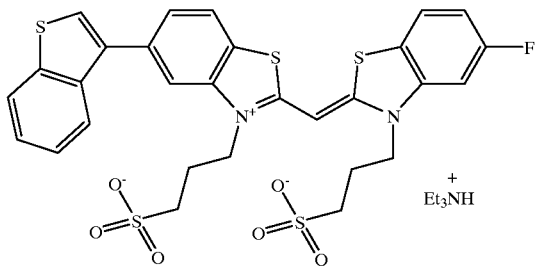
I-11
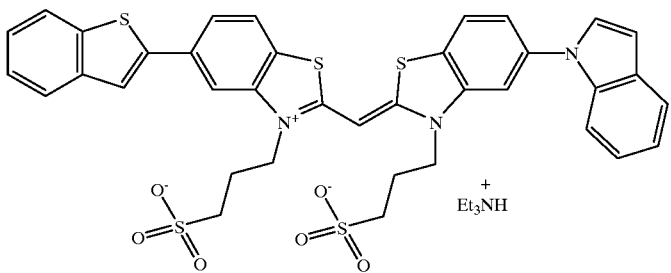

I-12
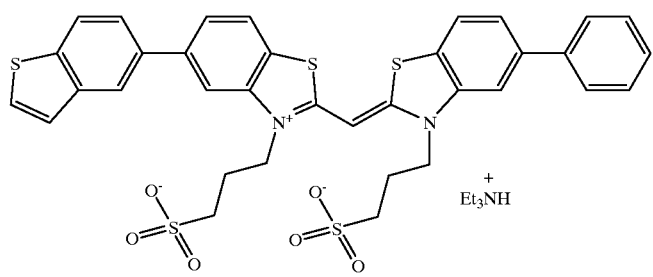
I-13
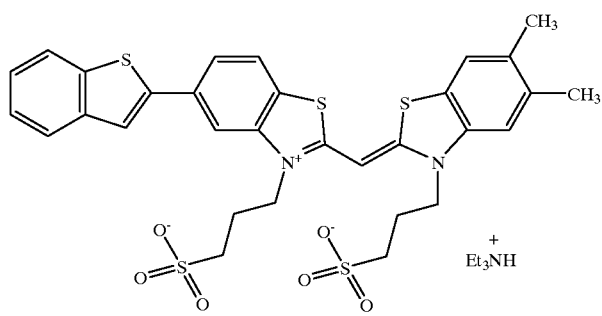
I-14
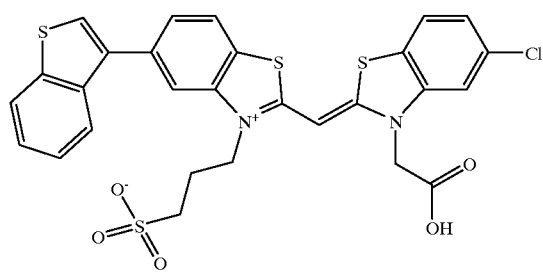
I-15
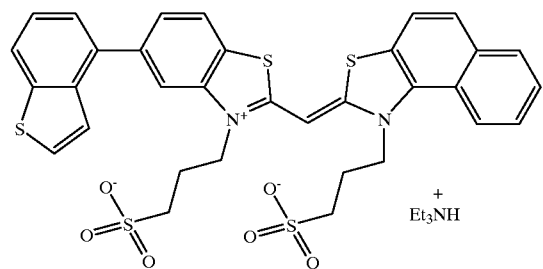
I-16
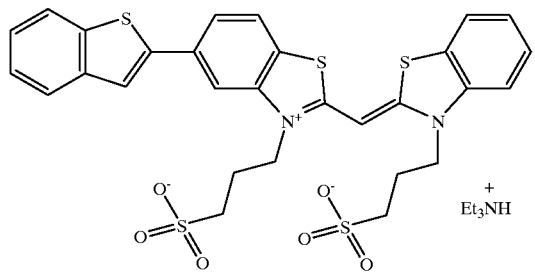

I-17
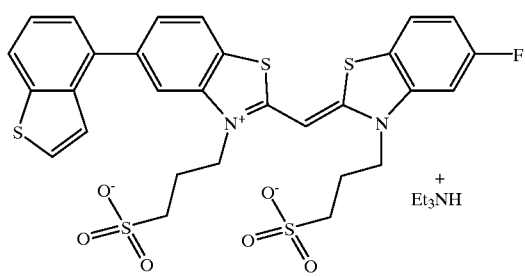
I-18
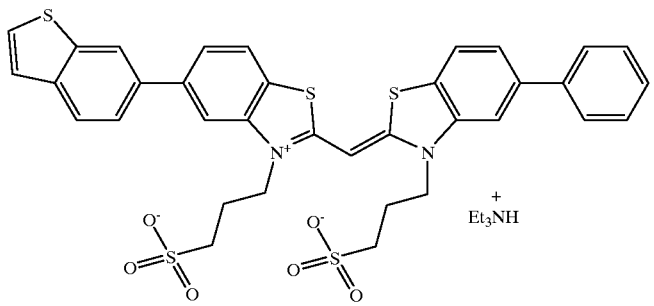
I-19
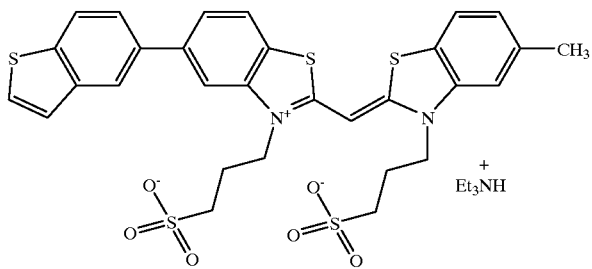
I-20
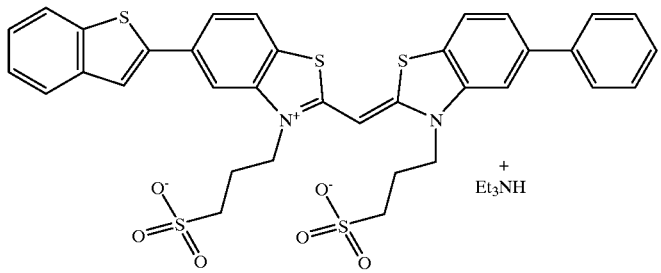
I-21
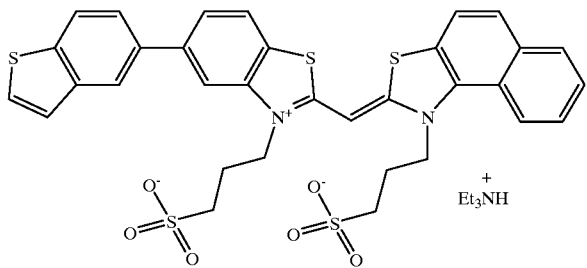

-continued
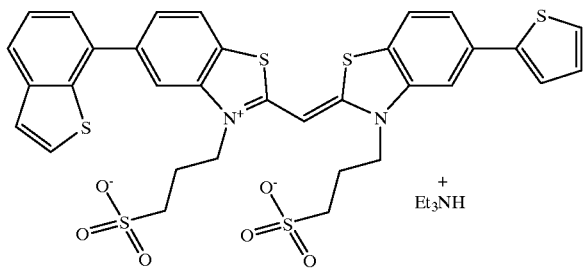
I-22
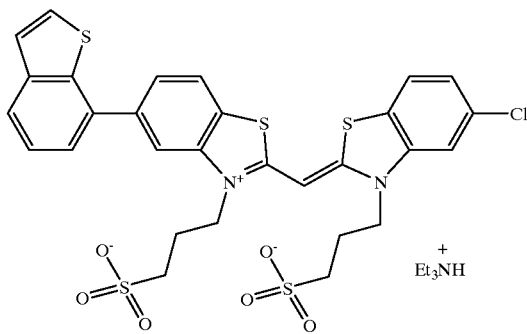
I-23
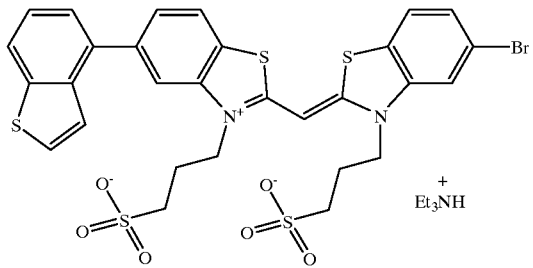
I-24
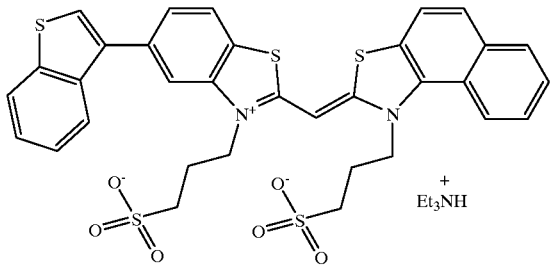
I-25
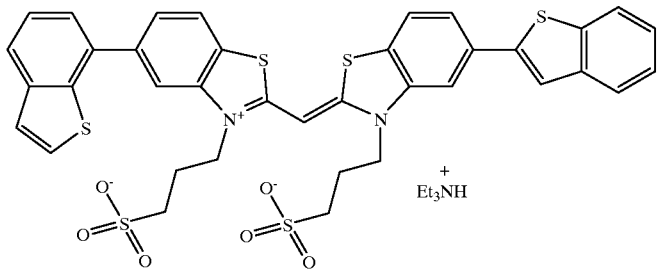
I-26

-continued
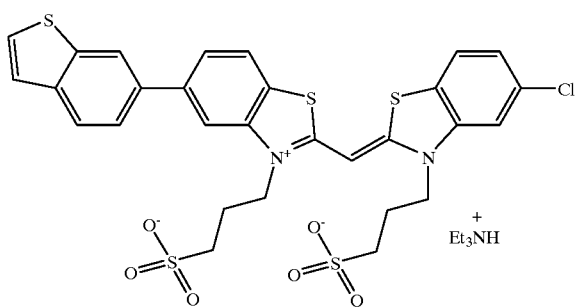
I-27
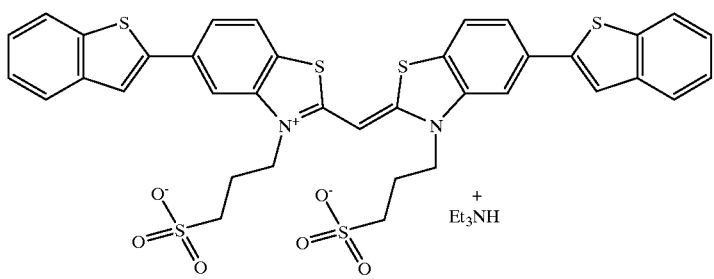
I-28
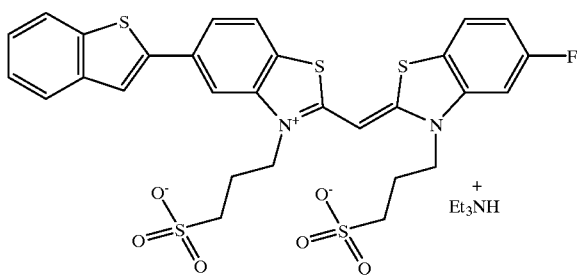
I-29
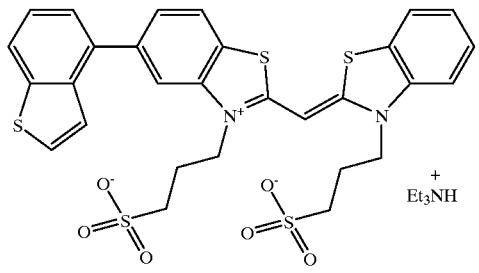
I-30
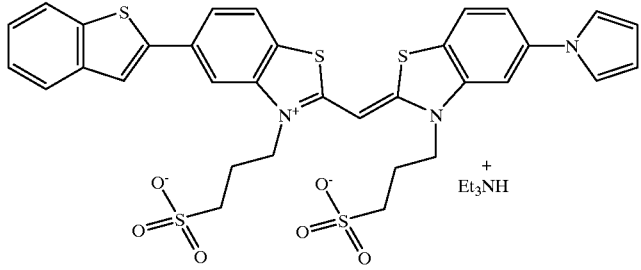
I-31

I-36
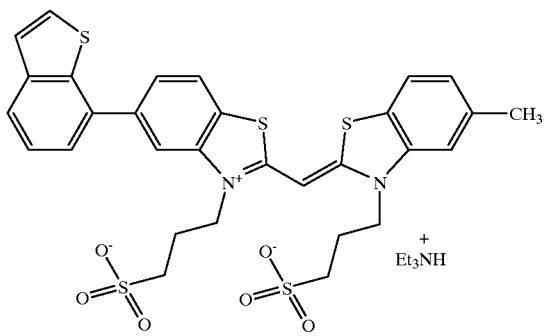
I-33
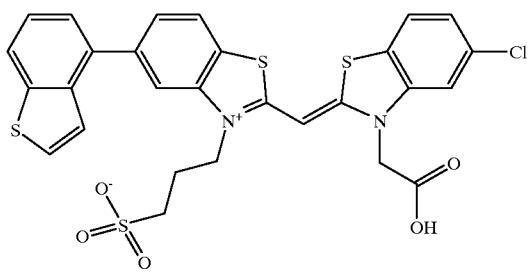
I-34
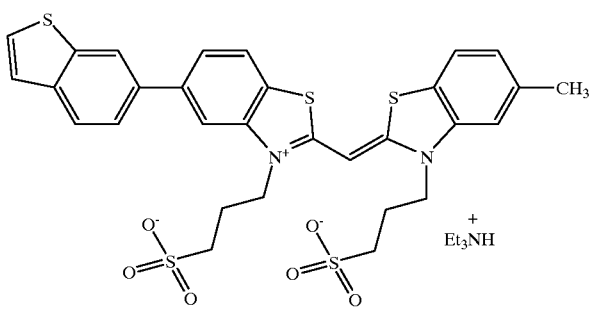
I-35
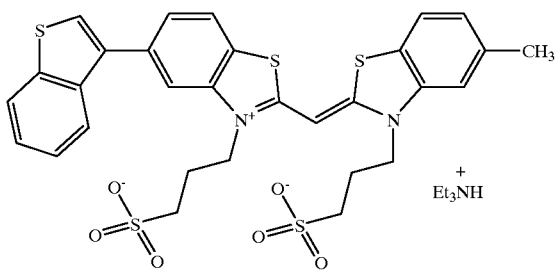
I-36
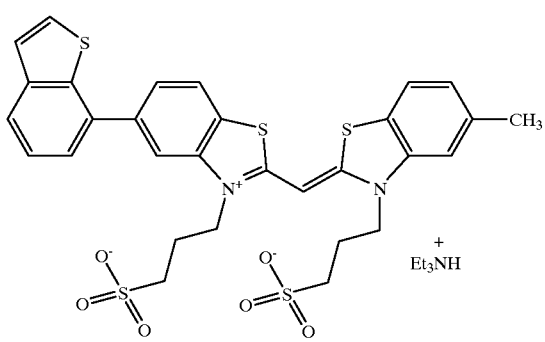

-continued
I-37
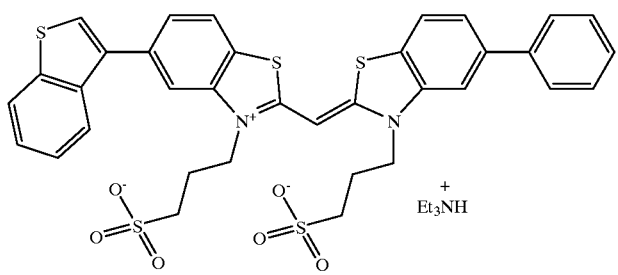
I-38
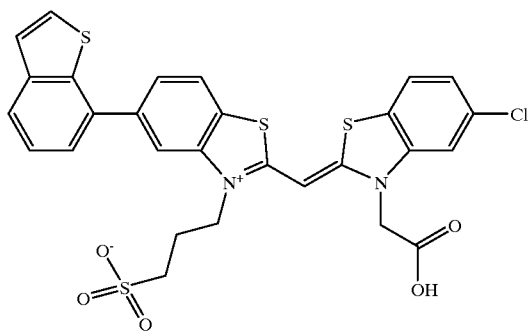
I-39
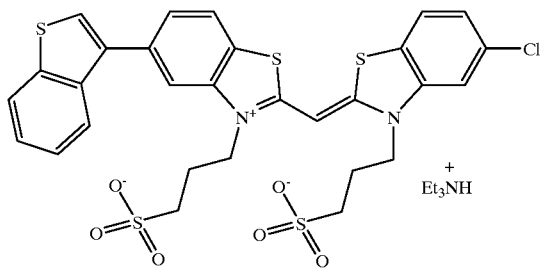
I-40
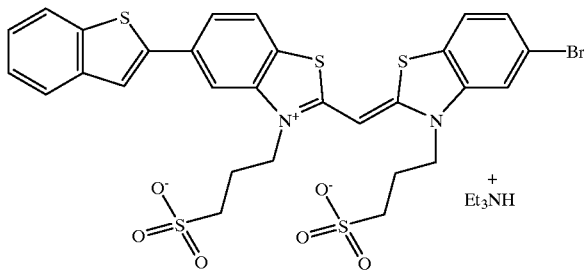
I-45
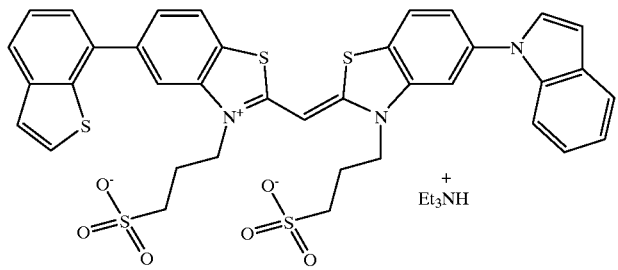

-continued
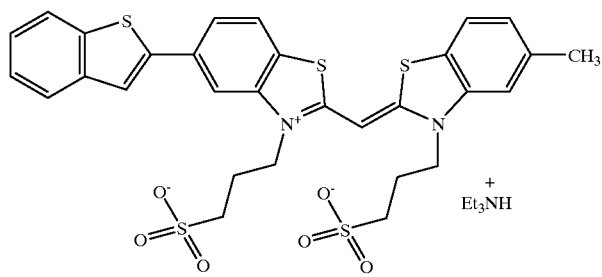
I-46
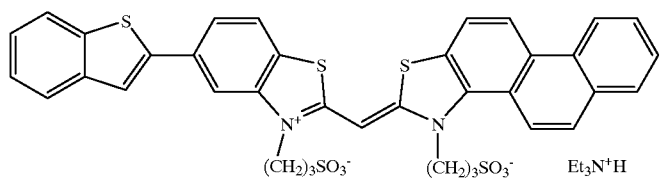
I-47
The preparation of the dye I-1 is explained by way of an example with the aid of the reaction scheme which follows.
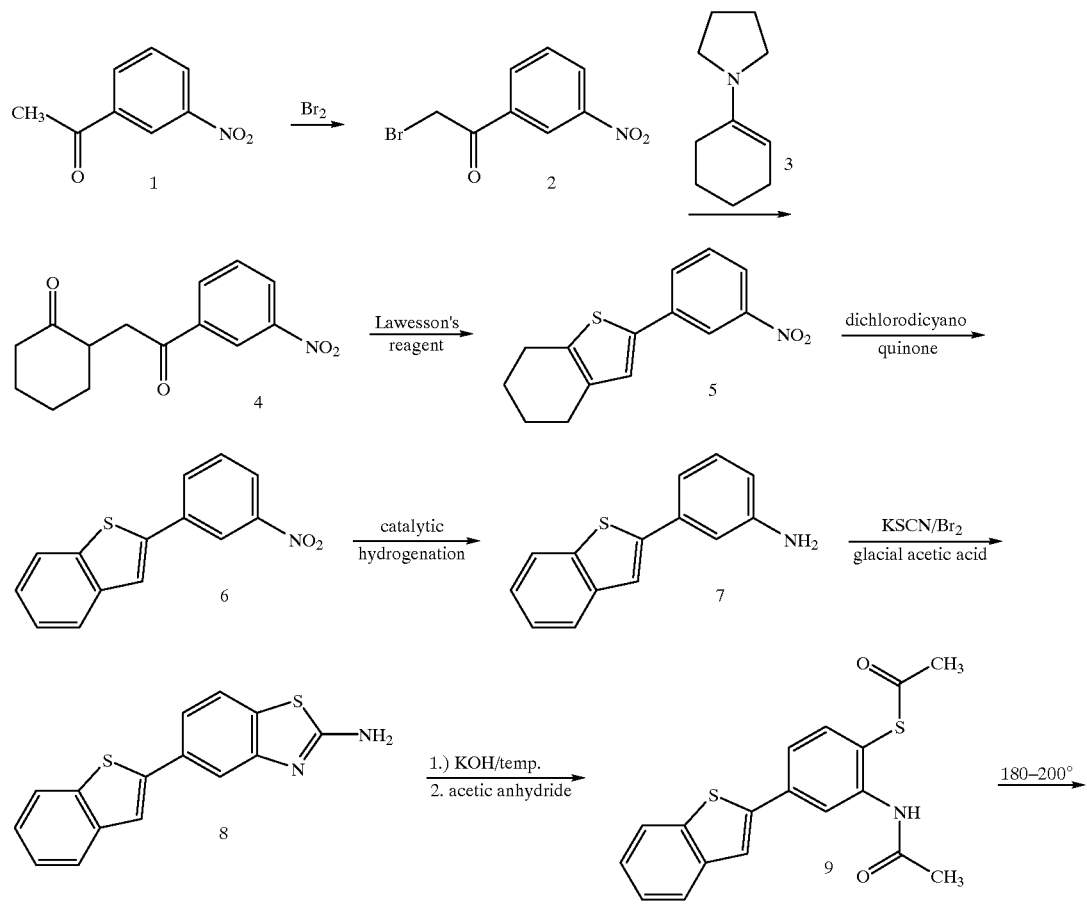

-continued

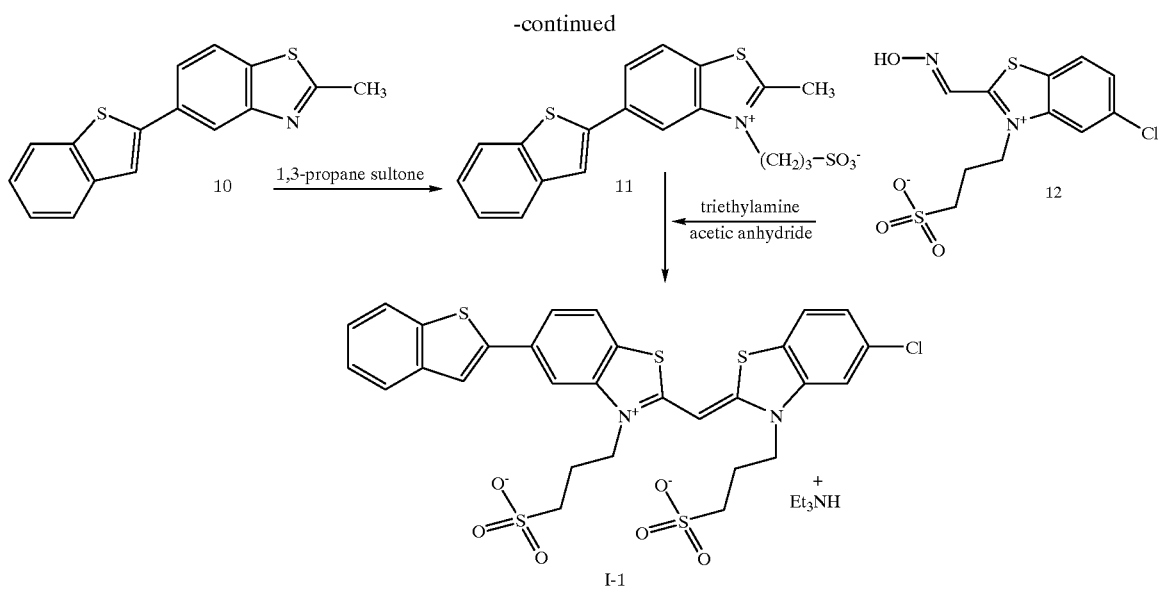

Synthesis of the Dye I-1

6 was synthesised in a manner analogous to the methods described in J. Heterocyclic Chem. 25, 1437 (1988). Catalytic hydrogenation to 7 took place in an autoclave, with Raney nickel as the catalyst. 8 was formed from 7 in a manner analogous to a method described in Chem. Ber. 36, 3121 (1903). Saponification of 8 with aqueous alkali, followed by acetylation, results in the diacetyl compound 9, which is cyclised thermally to the thiazole base 10 at 180–200° C.

Synthesis of the Quaternary Salt 11

1.41 g (5 mmol) of 10 and 0.61 g (5 mmol) of 1,3-propane sultone are stirred into 4 ml dichlorobenzene at 150° C. for 8 hours. After the mixture has cooled to room temperature, 20 ml acetone are added, the mixture is boiled up briefly, after which it is suction filtered after cooling, and is rewashed thoroughly with acetone. The residue is boiled out in 20 ml methanol. Yield: 1.63 g (81% of theoretical yield).

Synthesis of the Dye I-1

1.61 g (4 mmol) of 11 and 1.34 g (4 mmol) of 12 are suspended in 15 ml formamide at room temperature, with stirring, 1.24 g (12 mmol) of acetic anhydride are added, and 1.32 g (13.2 mmol) of triethylamine are dispensed in with cooling, such as not to exceed 20° C. After 18 hours at room temperature the dye which has precipitated out is suction filtered and is washed with acetone. 1.24 g (39% of theoretical yield) are obtained after recrystallisation from methanol.

The compound 12 was prepared by the method described in Res. Discl. 182, 301–303 (1979).

The sensitizing dyes according to the invention may be used alone or mixed with other sensitizing dyes, preferably other monomethine cyanine dyes. They are particularly suitable for the spectral sensitization of silver halide emulsions containing not less than 90 mol. % silver chloride.

Examples of colour photographic materials are colour negative films, colour reversal films, colour positive films, colour photographic paper, colour reversal photographic paper, colour-sensitive materials for the colour diffusion transfer process or the silver colour bleach-out process. Research Disclosure 37038 (February 1995) contains an overview of typical colour photographic materials and preferred embodiments and processing techniques.

The photographic materials consist of a support onto which at least one photo-sensitive silver halide emulsion layer is applied. Thin films and sheets are in particular suitable as supports. Research Disclosure 37254, Part 1 (1995), p. 285, gives an overview of support materials and auxiliary layers which are applied to the face or the back thereof.

The colour photographic materials normally contain at least one red-sensitive, one green-sensitive and one blue-sensitive silver halide emulsion layer and optionally intermediate layers and protective layers.

These layers may be arranged differently depending on the type of photographic material. The following may be representative of the most important products: colour photographic films such as colour negative films and colour reversal films have on the support in the sequence indicated below 2 or 3 red-sensitive cyan-coupling silver halide emulsion layers, 2 or 3 green-sensitive magenta-coupling silver halide emulsion layers and 2 or 3 blue-sensitive yellow-coupling silver halide emulsion layers. The layers of the same spectral sensitivity differ in their photographic sensitivity, wherein the less sensitive partial layers are generally arranged closer to the support than the more sensitive partial layers.

A yellow filter layer which prevents blue light from penetrating to the layers beneath it is normally arranged between the green-sensitive and the blue-sensitive layers.

The possible arrangements of the various layers and their effects on the photographic properties are described in J. Inf Rec. Mats., 1994, Vol. 22, pages 183–193.

Colour photographic paper, which is generally substantially less photosensitive than a colour photographic film, normally has on the support in the sequence indicated below one blue-sensitive yellow-coupling silver halide emulsion layer, one green-sensitive magenta-coupling silver halide emulsion layer and one red-sensitive cyan-coupling silver halide emulsion layer; the yellow filter layer may be omitted.

Modifications may be made to the number and arrangement of the photosensitive layers in order to achieve specific results. For example, all the high-sensitivity layers may be combined into one layer pack, and all the low-sensitivity layers into another layer pack in a photographic film, in order to increase sensitivity (DE-A-25 30 645).

Essential constituents of the photographic emulsion layers are binders, silver halide grains and couplers.

Research Disclosure 37254, Part 2 (1995), p. 286, gives details of suitable binders.

Details of suitable silver halide emulsions, and the preparation, ripening, stabilisation and spectral sensitization thereof, including suitable spectral sensitizers, are found in Research Disclosure 36544 (September 1994) and Research Disclosure 37254, Part 3 (1995), p. 286, and Research Disclosure 37038, Part XV (1995), p. 89.

Photographic materials having camera sensitivity normally contain silver bromide iodide emulsions which may optionally also contain small amounts of silver chloride. Photographic copying materials contain either silver chloride bromide emulsions having ing up to 80 mol. % AgBr or silver chloride bromide emulsions having more than 95 mol. % AgCl.

Research Disclosure 37254, Part 4 (1995), p. 288, and Research Disclosure 37038, Part 11 (1995), p. 80, give details of couplers. The maximum absorption of the dyes formed from the couplers and the colour developer oxidation product is preferably within the following ranges: yellow couplers 430 to 460 nm, magenta couplers 540 to 560 nm, cyan couplers 630 to 700 nm. The couplers are assigned spatially and spectrally to the relevant silver halide emulsion layer units or their partial layers.

Spatial assignment is understood in this context to mean that the coupler is in a spatial relation to the relevant silver halide layer such that a reciprocal effect is possible between them which permits an imagewise conformity between the silver image formed during developing and the colour image generated from the coupler. This is generally achieved in that the coupler is contained in the silver halide emulsion layer itself or in an optionally non-photosensitive binder layer adjacent to it.

Spectral assignment is understood to mean that the spectral sensitivity of the relevant photosensitive silver halide emulsion and the colour of the partial colour image generated from the spatially assigned coupler are in a specific relation to one another, wherein a complementarily coloured partial colour image (cyan, magenta, yellow) is assigned to the spectral sensitivity of each individual colour separation (red, green, blue).

In colour photographic films, in order to improve sensitivity, graininess, sharpness and colour separation, compounds are frequently used which, during the reaction with the developer oxidation product, liberate photographically active compounds, for example DIR couplers which release a developing inhibitor.

Details of such compounds, in particular couplers, are given in Research Disclosure 37254, Part 5 (1995), p. 290, and Research Disclosure 37038, Part XIV (1995), p. 86.

The dye couplers which are mostly hydrophobic, but also other hydrophobic constituents of the layers, are normally dissolved or dispersed in high-boiling organic solvents. These solutions or dispersions are then emulsified in an aqueous binder solution (normally gelatine solution) and after the layers have dried are present in the layers as fine droplets (from 0.05 to 0.8 mm diameter).

Suitable high-boiling organic solvents, methods of introducing the constituents into the layers of a photographic material and further methods of introducing chemical compounds into photographic layers are indicated in Research Disclosure 37254, Part 6 (1995), p. 292.

The non-photosensitive intermediate layers which are generally arranged between layers of different spectral sensitivity may contain agents which prevent the undesirable diffusion of developer oxidation products from one photosensitive layer into another photosensitive layer having a different spectral sensitization. Suitable compounds (white couplers, scavengers or developer oxidation product traps) are indicated in Research Disclosure 37254, Part 7 (1995), p. 292, and Research Disclosure 37038, Part III (1995), p. 84.

The photographic material may furthermore contain UV light-absorbing compounds, optical brightening agents, spacing means, filter dyes, formalin traps, light stabilisers, antioxidants, $D_{min}$ dyes, additives to improve the stability of dyes, couplers and whites and to reduce colour fogging, plasticisers (latices), biocides and others. Suitable compounds are indicated in Research Disclosure 37254, Part 8 (1995), p. 292, and Research Disclosure 37038, Parts IV, V, VI, VII, X, XI and XIII (1995), pp. 84 et seq.

The layers of colour photographic materials are normally cured, that is to say the binder used, preferably gelatine, is cross-linked by suitable chemical processes. Suitable curing substances are indicated in Research Disclosure 37254, Part 9 (1995), p. 294, and Research Disclosure 37038, Part XII (1995), p. 86.

Following imagewise exposure, colour photographic materials are processed by various methods according to their character. Details of methods and chemicals required are published in Research Disclosure 37254, Part 10 (1995), p. 294, and Research Disclosure 37038, Parts XVI to XXIII (1995), pp. 95 et seq., together with examples of materials.

EXAMPLE 1

A photosensitive recording material was prepared as follows, using the sensitizing dye I-1:

14.9 mg of the dye I-1 dissolved in 25 ml methanol are added to 100 g of a silver chloride emulsion after 45 minutes at 40° C. After 60 minutes' stirring at 40° C., 6 mg of ST-A dissolved in 6 ml water, 112.5 mg potassium bromide dissolved in 12 ml water and 2.2 mg of ST-B dissolved in 5 ml dilute sodium hydroxide solution are added. After 10 minutes' stirring at 40° C., 50 ml water, 81 g of a 20 wt. % gelatine solution, 14.0 g of coupler K-1 and 6.2 g of coupler K-2 emulsified in 204 g water and 33.3 g of the oil-forming agent O-1 (polymeric mixed ester prepared from adipic acid and a mixture of 1,3- and 1,4-butanediol and 2-ethyl propanediol), and 0.32 g of the wetting agent NM-1 dissolved in 8 ml water are added. After a further 15 minutes, the emulsion is cast and then cured.

Further recording materials were prepared in the same manner but using other sensitizing dyes, as shown in Table 1, instead of the sensitizing dye I-1 according to the invention. The sensitivity of the recording materials thus prepared was determined. For this purpose samples of the material were exposed behind a graded wedge and underwent colour negative processing in accordance with the so-called RA-4 process as disclosed in DE 40 08 067 A1 or DE 40 38 965 A1. The results are set out in Table 1.

TABLE 1

| Dye  | Sensitivity* |            |
|------|--------------|------------|
| I-1  | 1.00         | invention  |
| I-39 | 0.98         | invention  |
| V-1  | 0.84         | comparison |
| V-2  | 0.92         | comparison |
| V-3  | 0.78         | comparison |

Table 1: *sensitivity of I-1 is taken as standard.

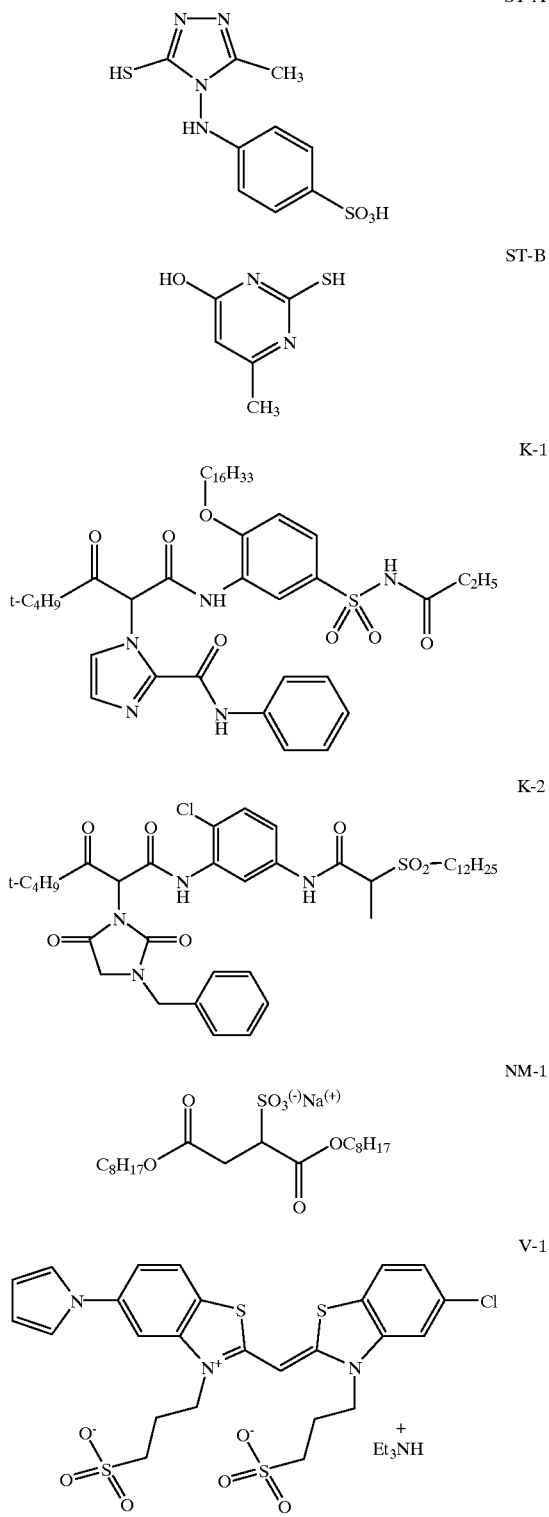
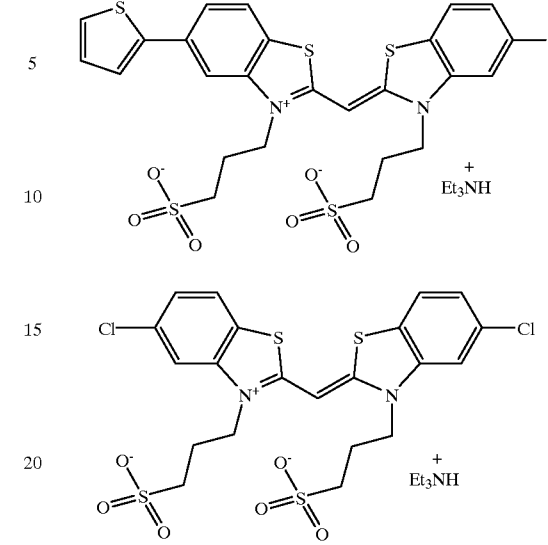

EXAMPLE 2

The Raw Emulsion EM

The preparation was started from a stirred solution of 144 g inert gelatine and 107 g potassium bromide in 18 kg water. At 30° C. a twin feed of an aqueous silver nitrate solution (47 g silver nitrate in 550 g water) and an aqueous halide solution (33 g potassium bromide in 550 g water) was dispensed into the solution within 30 seconds. 395 g of inert gelatine in 4 kg water were then added. After heating to 74° C. an aqueous silver nitrate solution (114 g silver nitrate in 1,400 g water) was added within 20 minutes.

The second twin feed was added, likewise at 74° C. For this, an aqueous silver nitrate solution (1,339 g silver nitrate in 8.3 kg water) and an aqueous halide solution (1,117 g potassium bromide in 9.8 kg water) were dispensed in within 50 minutes at an increasing dispensing rate. The dispensing rate in this case was increased in 10 steps from an initial 70 ml/min to 400 ml/min. During the feed, the pBr value of 2.3 in the dispersion medium was held constant.

After the final feed, the emulsion was cooled to 25° C,. flocculated at pH 3.5 by the addition of polystyrenesulphonic acid and then washed at 20° C. The flocculate was then made up to 7.5 kg with water and was redispersed at pH 6.5 at a temperature of 50° C.

The emulsion contained over 80% (relative to the projected area of the crystals) hexagonal plates having an aspect ratio (average diameter of a circle having the same area as the projected area/thickness of plates) of 8 and an adjacent edge ratio of from 1:1 to 1.5:1. The grain size was 0.55 μm and the distribution width 18%.

Ripening the Emulsion EM

The silver bromide emulsion EM is chemically ripened at 55° C., pAg 7.4 and pH 6.5 with 5.0 μmol tetrachloroauric acid, 690 μmol potassium thiocyanate, 20 μmol sodium thiosulphate per mol silver.

The emulsion EM is spectrally sensitized by adding to respective samples of the 40° C.-hot ripened emulsion, after the addition of 350 mg/100 g Ag 4-hydroxy-6-methyl-1,3,3a,7-tetraazaindene, in each case 500 μmol/mol Ag sensitizing dye dissolved in methanol or a mixture of methanol/phenoxyethanol, followed by stirring for a further 20 minutes at 40° C.

An emulsion of a magenta coupler M-1 is added to each sample which is applied to a 120 μm-thick support prepared from subbed cellulose acetate.

The cast individual layers contain per m²:

AgBr corresponding to 0.63 g AgNO₃, 1.38 g gelatine, 0.95 g magenta coupler M-1, 0.29 g tricresyl phosphate.

The materials are cured by applying a protective layer prepared from 0.2 g gelatine and 0.3 g of instant curing agent (H-1) per m².

The sensitivities of the materials thus prepared were determined. For this, samples of the materials were exposed behind a graded wedge and underwent colour negative processing in accordance with "The Journal of Photographic Science 1974, pp. 597, 598. The results are set out in Table 2.

M-1

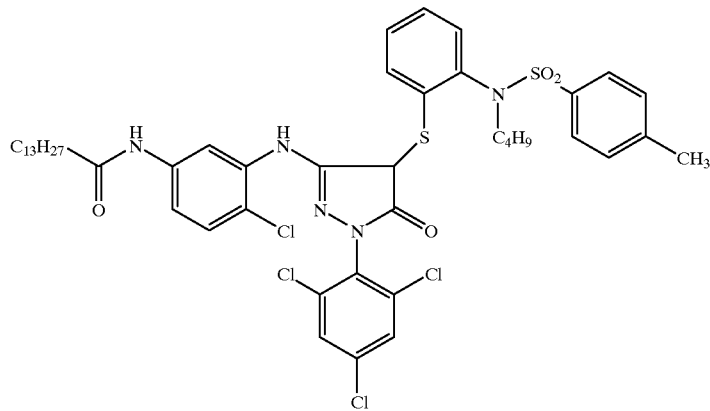

H-1

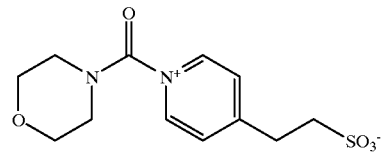

TABLE 2

| Dye | Sensitivity* | Type |
|---|---|---|
| I-1 | 0.97 | invention |
| I-28 | 1.00 | invention |
| V-1 | 0.86 | comparison |
| V-2 | 0.89 | comparison |
| V-3 | 0.83 | comparison |

Table 2: *sensitivity of I-28 is taken as standard.

As can be seen from Tables 1 and 2, the sensitizers according to the invention result in higher sensitivities.

We claim:

1. A color photographic recording material comprising at least one photosensitive silver halide emulsion layer which is spectrally sensitized with a monomethine cyanine dye, and said monomethine dye corresponds to the formula I:

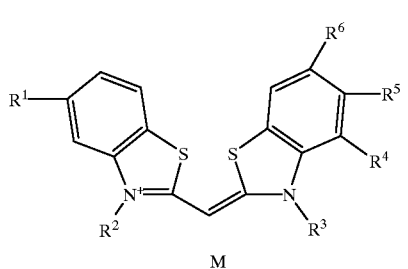

in which:

$R^1$ is a benzothiophene radical which is coupled by way of the 2-, 3-, 4-, 5-, 6- or 7-position thereof to the benzo ring of the benzothiazole group, $R^2$ and $R^3$ (the same or different) and are sulphoalkyl, carboxylalkyl, —$(CH_2)_n$—$SO_2$—NH—$SO_2$—NH—$SO_2$-alkyl,
—$(CH_2)_n$—$SO_2$—NH—CO-alkyl, and n is 1 to 6;

$R^4$ to $R^6$ (the same or different) and are hydrogen, halogen, —CN, —CF₃, alkyl, alkoxy, aryl or a heterocyclic group;

or $R^5$ together with $R^4$ or $R^6$ forms an optionally substituted benzene ring; and M is a cation necessary to balance the charge.

2. Recording material according to claim 1, wherein $R^5$ and/or $R^6$ stands for chlorine, methyl, phenyl, 1-pyrrolyl, 1-indolyl, 2-thienyl or 2-benzothienyl.

3. Recording material according to claim 1, wherein the silver chloride content in the silver halide of the silver halide emulsion layer is not less than 90 mol. %.

4. A color photographic recording material comprising at least one photosensitive silver halide emulsion layer which is spectrally sensitized with a monomethine cyanine dye, and said monomethine dye corresponds to the formula I:

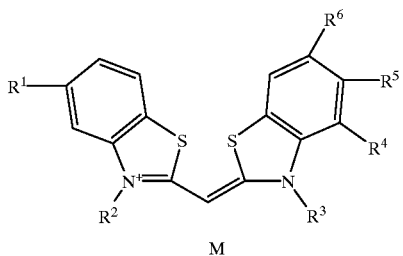 (I)

in which:
- $R^1$ is a benzothiophene radical which is coupled by way of the 2-, 3-, 4-, 5-, 6- or 7-position thereof to the benzo ring of the benzothiazole group,
- $R^2$ and $R^3$ (the same or different) and are sulphoalkyl, carboxylalkyl, —$(CH_2)_n$—$SO_2$—NH—$SO_2$—NH—$SO_2$-alkyl, —$(CH_2)_n$—$SO_2$—NH—CO-alkyl, —$(CH_2)_n$—CO—NH—$SO_2$-alkyl or —$(CH_2)_n$—CO—NH—CO-alkyl and n is 1 to 6;
- $R^4$ to $R^6$ (the same or different) and are hydrogen, halogen, —CN, —$CF_3$, alkyl, alkoxy, aryl or a heterocyclic group;
- or $R^5$ together with $R^4$ or $R^6$ forms an optionally substituted napthalene ring; and
- M is a cation necessary to balance the charge.

5. Recording material according to claim 4, wherein $R^5$ and/or $R^6$ stands for chlorine, methyl, phenyl, 1-pyrrolyl, 1-indolyl, 2-thienyl or 2-benzothienyl.

6. Recording material according to claim 4, wherein the silver chloride content in the silver halide of the silver halide emulsion layer is not less than 90 mol. %.

7. Recording material according to claim 5, wherein the silver chloride content in the silver halide of the silver halide emulsion layer is not less than 90 mol. %.

* * * * *